(12) United States Patent
Runge et al.

(10) Patent No.: US 8,117,035 B2
(45) Date of Patent: Feb. 14, 2012

(54) METHOD AND DEVICE FOR VERIFYING THE IDENTITY OF A USER OF SEVERAL TELECOMMUNICATION SERVICES USING BIOMETRIC CHARACTERISTICS

(75) Inventors: Fred Runge, Berlin (DE); Juergen Emhardt, Berlin (DE)

(73) Assignee: Deutsche Telekom AG, Bonn (DE)

( * ) Notice: Subject to any disclaimer, the term of this patent is extended or adjusted under 35 U.S.C. 154(b) by 1306 days.

(21) Appl. No.: 11/737,963

(22) Filed: Apr. 20, 2007

(65) Prior Publication Data

US 2007/0250322 A1 Oct. 25, 2007

(30) Foreign Application Priority Data

Apr. 21, 2006 (DE) .......................... 10 2006 019 362

(51) Int. Cl.
*G10L 21/00* (2006.01)
(52) U.S. Cl. ..................... 704/270.1; 704/246; 704/247; 704/251; 704/252; 704/270
(58) Field of Classification Search .................. 704/231, 704/246, 251, 252, 270, 270.1, 273, 275
See application file for complete search history.

(56) References Cited

U.S. PATENT DOCUMENTS

| 6,657,538 | B1 | 12/2003 | Ritter et al. | |
|---|---|---|---|---|
| 2002/0194003 | A1* | 12/2002 | Mozer | 704/270.1 |
| 2003/0110034 | A1 | 6/2003 | Runge et al. | |
| 2003/0161503 | A1 | 8/2003 | Kramer | |
| 2004/0010697 | A1* | 1/2004 | White | 713/186 |
| 2004/0107099 | A1 | 6/2004 | Charlet | |
| 2004/0121813 | A1 | 6/2004 | Colson et al. | |
| 2004/0164848 | A1* | 8/2004 | Hwang et al. | 340/5.82 |
| 2004/0219902 | A1* | 11/2004 | Lee et al. | 455/410 |
| 2005/0039053 | A1* | 2/2005 | Walia | 713/201 |

FOREIGN PATENT DOCUMENTS

| DE | 10054633 | 4/2002 |
|---|---|---|
| DE | 10133647 | 12/2002 |
| EP | 1172771 | 1/2002 |
| EP | 1197827 | 4/2002 |
| EP | 1202228 | 5/2002 |
| EP | 1 249 016 | 10/2002 |
| EP | 1564619 | 8/2005 |
| WO | WO-9924938 | 5/1999 |
| WO | WO-0167201 | 9/2001 |
| WO | WO-02071314 | 9/2002 |
| WO | WO-02095552 | 11/2002 |

* cited by examiner

*Primary Examiner* — Leonard Saint Cyr
(74) *Attorney, Agent, or Firm* — Leydig, Voit & Mayer, Ltd.

(57) ABSTRACT

A method and device for verification of an identity of a subscriber of a communication service on a telecommunications network is provided. The communication service requires authentication of the subscriber. The verification includes comparing a reference biometric with at least one biometric characteristic detected from a biometric sample of the subscriber, in order to provide the subscriber with access to the restricted communication service. The reference biometric can be adapted and used for verification purposes based on the different security requirements of the various communication services provided on the telecommunications network.

22 Claims, 7 Drawing Sheets

METHOD AND DEVICE FOR VERIFYING THE IDENTITY OF A USER OF SEVERAL TELECOMMUNICATION SERVICES USING BIOMETRIC CHARACTERISTICS

CROSS REFERENCE TO RELATED APPLICATION

This application claims priority to German patent application DE 10 2006 019 326.8, filed Apr. 21, 2006, which is hereby incorporated by reference as if set forth in its entirety.

The invention relates to verification of an identity that has been assumed for a user or subscriber who calls, or who is called, and is connected via a communication terminal device to a telecommunication network, on the basis of at least one biometric characteristic, in order to connect the calling subscriber to a communication system that supports at least one communication service that requires authentication from among a plurality of communication services that require authentication and that have different security requirements.

BACKGROUND

Traditionally, a telecommunication connection or a communication terminal device that is connected to a telecommunication network is identified by means of appropriate identifiers transmitted in various telecommunication networks. Such identifiers include, for example, CLI (calling line identification), ANI (automatic number identification), HLR (home location register), IP address, ID number, etc. The person-related differentiation among individual users, for instance, several users of one telecommunication connection, is possible, for example, by requesting a person-related identifier such as a PIN. Speech-processing systems and speaker-processing systems are likewise part of the state of the art. Whereas speech recognition systems recognize the content of the spoken utterance made, speaker recognition systems, including systems for speaker verification, speaker identification, and speaker classification, are geared towards recognizing typical speech characteristics. Since the technique of speaker recognition is similar in many ways to speech recognition, both functions are often combined with each other in one single device for many types of applications. Algorithms that can recognize a large number of speech utterances in real time employ approaches based on probability theory, whereby the mode of operation is basically broken down into a preliminary processing of an acquired speech signal in order to derive a pattern from this speech signal, into a teaching to generate a reference pattern and into a recognition using computations usually based on probability theory.

There have been systems and methods that allow a user or a calling subscriber who is connected via a communication terminal device to a telecommunication network to gain access to a desired telecommunication service, e.g., a speech service, once the speaker verification has been successfully completed. In general, after an identifier has been ascertained, speech utterances of a calling subscriber are acquired as the current voice or speech sample. Then, a pattern or biometric stored under the identifier as a reference pattern or reference biometric is read out and compared to the current voice or speech sample in order to carry out a test for a similarity specified within certain limits. For instance, a comparative value which, for example, becomes greater as the similarity of the current biometric voice or speech sample to the characteristics of the reference pattern becomes greater, can be provided as a measure of the similarity. If the measure of similarity exceeds a specified value, the biometric voice or speech sample can be acknowledged as "accepted" in this case. Generally speaking, the higher the security requirements, the narrower the so-called limit or threshold value for the measure of similarity that is defined. Such a method is described, for example, in EP 1 249 016 B1, which is hereby incorporated by reference as if set forth in its entirety.

In the description herein, the term "verification" designates a procedure that fundamentally serves to confirm the veracity of an assumed or alleged condition. The term "authentication" designates the verification of an identity about which an assumption has been made, for example, by transmitting an identifier, with a check for conformance between the actual identity and the identity for which an assumption or claim was made within the scope of the transmission of the identifier. The term "biometric sample" generally designates a usually digitized recording of at least one biometric characteristic of a person, so that, for instance, the term "voice or speech sample" designates a digitized and/or further processed recording of a speech utterance.

In a complex process, such a data record is then used to detect a structure of the at least one biometric characteristic, a so-called "characteristic structure", for instance, a voice profile consisting of at least one digitized recording of a speech utterance, usually of a limited duration. A "biometric" is a pattern of recurring structures of biometric characteristics computed in a complex process on the basis of at least one biometric sample of exactly one person. The biometric is stored and can be used as a reference biometric to compute the similarity, particularly on the basis of specified characteristics, to at least one new biometric sample. Therefore, a "voiceprint" is a pattern of usually recurring characteristic structures of a voice generated in a complex process from at least one voice sample of a certain person, and this voiceprint is stored and can then be used as a "reference voiceprint" to compute the similarity to at least one new voice sample.

Figure 6:
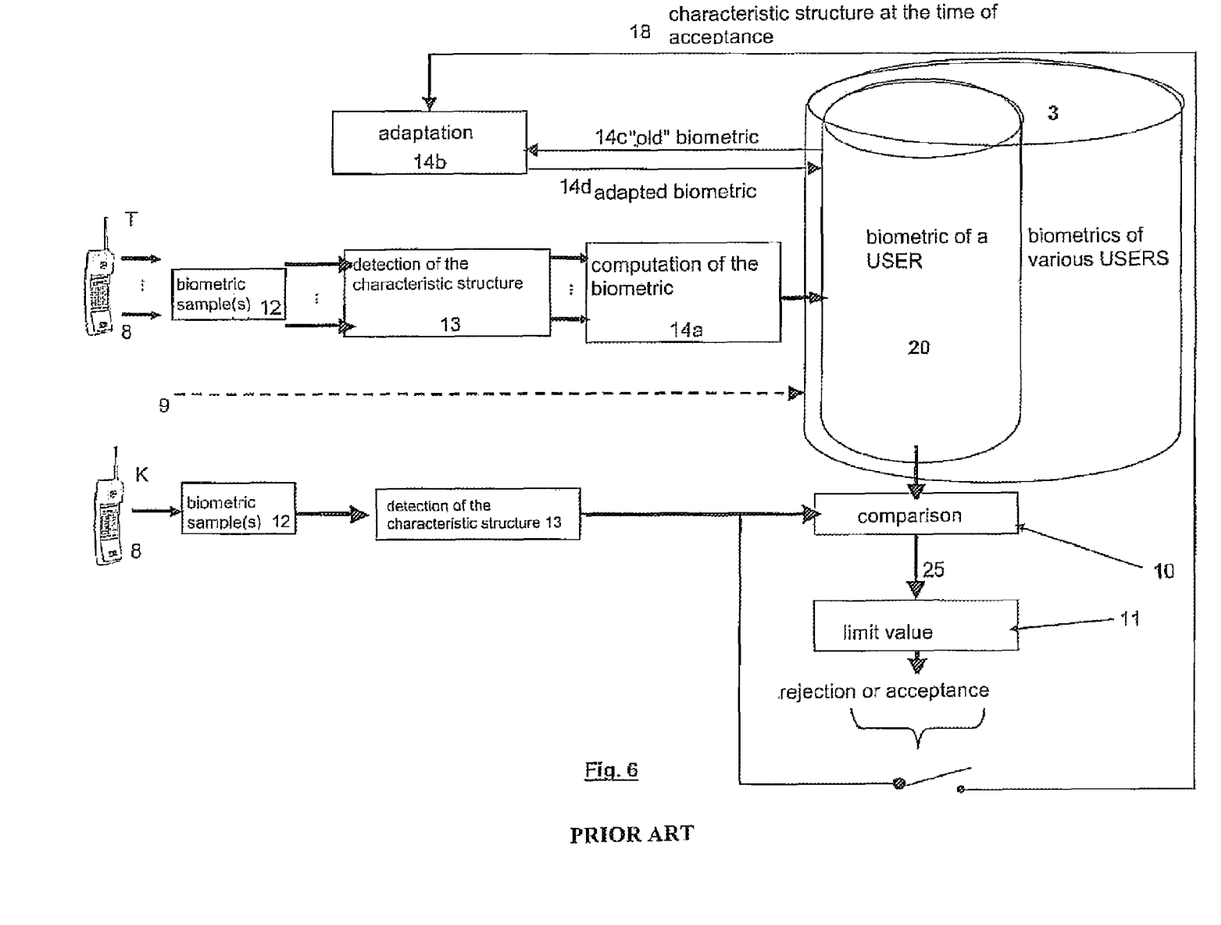
FIG. 6 illustrates a first system for subscriber verification according to the prior art.

In order to obtain a biometric such as, for instance, a voiceprint, as schematically shown in FIG. 6, during the login to use the service, the user 8 or calling subscriber using a communication terminal device is generally requested in a dialog to provide one or more speech samples 12 for purposes of the teaching "T", said samples serving to create the biometric, in other words, to create the voiceprint according to FIG. 6. Using an implemented algorithm, characteristic structures are detected 13 from the speech samples 12 during the initialization or teaching dialog "T", and these characteristic structures then serve to compute 14a a voiceprint that is associated with the user or calling subscriber 8.

In this process, the user 8 is identified by an automatically determined identifier 9, e.g., a CLI, ANI, HLR, IP address, ID number, or else by providing an identifier 9 upon request. The ascertained voiceprint is associated with this identifier 9 and this voiceprint, as defined above, is not a copy of the biometric voice samples but rather a data record made up of the voice samples obtained during the teaching "T" and computed by means of a specific algorithm. The ascertained voiceprint 20 is usually stored in a separate data area of a memory 3, also referred to as a repository, in such a manner as to be indexed by the identifier 9. The memory 3 stores the biometrics of various users.

The voiceprint 20 thus stored can then be employed at the time of a later contact "K" of the user 8 with the system in order to perform an authentication procedure to verify the user's identity that has been assumed on the basis of the transmitted identifier 9. For this purpose, the user 8 is once again requested to provide at least one voice or speech sample 12, for example, in the form of a spoken sequence of numbers. The characteristic structure of this sample 12 is detected 13 and then compared 10 to the characteristics of the voiceprint 20 present in the system and relating to that identifier. During the comparison process, a measure of similarity 25 is ascertained that reflects the similarity of the characteristics of the obtained biometric voice sample to the reference voiceprint. If, for example, the measure of similarity 25 exceeds a previously specified limit or threshold value 11, then it is presumed, for instance, that the user who left the current voice sample is identical to the user who performed the corresponding teaching for the voiceprint that is used as the reference voiceprint for the comparison.

Moreover, as can be seen in FIG. 6, in case of a successful authentication, the biometric sample provided during the authentication process can now be used, if so desired, not only for verification/authentication but also to further adapt 14b the biometric stored for this user or calling subscriber. The biometric voiceprint 20 that was employed for the comparison and the accepted characteristic structure 18 of the currently obtained speech sample 12, is used as the biometric 14c to be adapted. The biometric voiceprint 20 is used as the basis to create a new, adapted voiceprint 14d that is then stored as the voiceprint 20.

If the reference biometric according to FIG. 6 is only provided for the utilization of one single service or for the utilization of several services having the same security requirements, and thus only for utilization with one and the same limit value 11 for the measure of similarity, it is often the case that there are no concerns about the use of such a procedure to adapt the biometric over a prolonged period of time.

Figure 7:
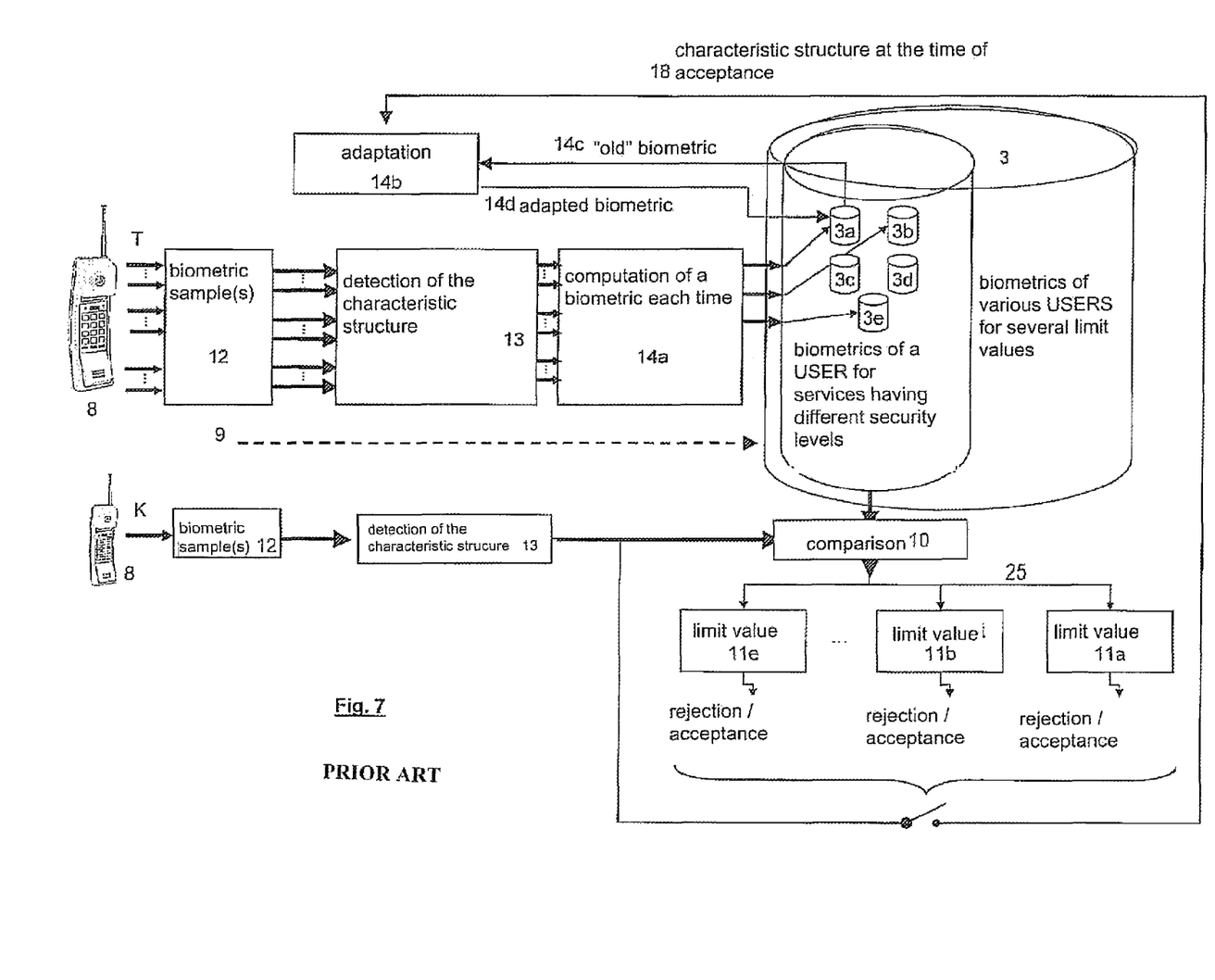
FIG. 7 illustrates a second system for subscriber verification according to the prior art.

However, if the user or calling subscriber 8 has to authenticate himself with a communication terminal device for several services having different security requirements and thus on the basis of different limit values 11a to 11e for the measure of similarity 25, as schematically shown in FIG. 7, then, depending on the security level, he has to teach different service-specific voiceprints 3a to 3e within the scope of several teaching dialogs or sessions "T". On the one hand, as a function of the security level applicable in each case, these different limit values 11a to 11e for the measure of similarity 25 also apply to the adaptation of a given voiceprint 3a to 3e after a successful authentication. Otherwise, when only one single voiceprint is employed per user, the incorporation of characteristic patterns 13 with a worse/lower measure of similarity 25 detected from speech samples 12, in the case of a limit value with worse/lower requirements for services that are less security-relevant, will adapt the quality of the voiceprint on hand, over the course of time, to services having the lowest security requirements.

The voiceprints 3a to 3e refer to different security levels as shown accordingly in FIG. 7. On the other hand, in the case of different services having different security requirements, it is usually necessary to have a separate data area for each service or service group having the same security level, which also means that a separate teaching cycle "T" has to be carried out for each service or service group having the same security requirements in order to generate the voiceprints 3a to 3e for the same user who then has to undergo this procedure for each service, that is to say, several times.

SUMMARY

In an embodiment, the present invention provides a method or device for verification of an identity of a subscriber of a communication service on a telecommunications network. The communication service requires authentication of the subscriber. The verification includes comparing a reference biometric with at least one biometric characteristic detected from a biometric sample of the subscriber, in order to provide the subscriber with access to the restricted communication service. The reference biometric can be adapted and used for verification purposes based on the different security requirements of the various communication services provided on the telecommunications network.

BRIEF DESCRIPTION OF THE DRAWINGS

Exemplary embodiments of the present invention are explained in more detail below with reference to the accompanying drawings, in which.

DETAILED DESCRIPTION

The present invention is directed to reducing the drawbacks, as discussed above, as well as reducing the requirements in terms of time, memory and/or adaptation of traditional systems. In particular, the present invention provides a way to authenticate users of different telecommunication services, especially speech services, so that a user only has to teach his biometric, especially his voiceprint, one time. Then, over a long period of time, the user can use different communication services that require authentication, or newly added services having different security levels, without having once again to teach the biometric that later has to be adapted for each new service, involving an adaptation to the security requirements of said system.

Accordingly, the invention provides a method that, on the basis of at least one biometric characteristic, performs a controlled verification of an identity that has been assumed for a subscriber who has called, or who has been called, and who is connected to a telecommunication network via a communication terminal device, namely, in order to connect the calling or called subscriber to a communication system that supports at least one communication service that requires authentication from among a plurality of communication services that require authentication and that have different security requirements. After a communication connection has been established between the subscriber and a verification device connected to the telecommunication network, an ascertained identifier and the subscriber are associated with each other and, on this basis, a certain identity of the subscriber is assumed. Then a request to use at least one communication service that requires authentication is transmitted to the verification device, at least one biometric sample of the subscriber is acquired and a biometric characteristic structure is ascertained from the biometric sample.

When a subscriber authentication procedure is carried out for the requested communication service, a biometric that is associated and stored for the identifier for initialization purposes and that serves for the authentication of the subscriber for the total number of communication services that require authentication, or an adapted biometric that is subsequently associated and stored and that serves for the authentication of the subscriber is read out—at least for the requested communication service—as the reference biometric and compared to at least one characteristic of the detected biometric characteristic structure. When a first limit value is reached in response to the comparison result, the identity of the subscriber is verified for the requested communication service and the subscriber is connected to the communication system that supports this requested communication service. When a second limit value is reached in response to the comparison result, the detected biometric characteristic structure is employed to compute an adapted biometric and, at least for purposes of authenticating the subscriber for the requested communication service, this biometric is associated and stored for the identifier instead of the biometric that was used as the reference biometric.

Consequently, the approach according to the invention makes it possible to undertake one teaching cycle and to generate one single biometric for initialization purposes in order to use different communication services that require authentication and that satisfy different security requirements. Consequently, in order to reduce the requisite number of components, only one data area needs to be employed and thus administered for all of these services. Therefore, all of the embodiments and refinements of the present invention have in common the fact that only one single biometric needs to be generated for initialization purposes for each user for at least two applications and/or sub-applications that require authentication, said biometric being adapted during and/or after at least one authentication procedure following a successful verification and only in compliance with a limit or threshold value specially specified for the adaptation and making use of the biometric sample(s) obtained during the verification.

In order to activate such a teaching cycle, it is preferably provided that, prior to carrying out an authentication of a subscriber, it should be checked whether the identified subscriber should be treated as a first-time user or perhaps whether a resetting procedure, which has been indicated by the subscriber or by the verification device by means of a signal, should be performed for the identified subscriber. If this checking procedure shows that the subscriber should be treated as a first-time user or else that a resetting procedure should be carried out, then a biometric is computed on the basis of at least one biometric characteristic structure and this biometric is associated and stored for the identifier for initialization purposes in order to authenticate the subscriber for the plurality of communication services that require authentication.

In a practical manner, any adapted biometric is computed using not only the detected biometric characteristic structure but additionally using the biometric employed as the reference biometric during the authentication procedure, and/or additionally using at least one stored biometric sample and/or a biometric characteristic structure based on an earlier communication connection with the subscriber. This facilitates the compliance with a requisite quality during the adaptation as well as the monitoring of a gradual change in the biometric characteristics.

Another advantage of the present invention is based on the fact that, when communication services such as, for example, so-called identity-provider services are offered nowadays, uniform biometrics, especially also voiceprints, can be created and also adapted, and can then be used for different services entailing different security levels. Particularly in the case of standardized data formats among various data areas and memories of different systems that support such communication services, also in the case of different identity providers that have laid down uniform limit values—optionally with a standardized metric—the biometrics created according to the invention can be conveniently used interchangeably without the need to provide the limit values separately in certain circumstances. At the same time, only one single data area is needed for the biometrics of users of one or more systems that support such communication services.

The present invention also encompasses a device comprising units that are appropriately configured to carry out the method according to the invention, as well as a storage medium where signals are stored that, once they are read out in a computer-supported device connected to a telecommunication network, bring about the execution of a subscriber authentication by means of the method according to the invention.

Therefore, the device according to the present invention encompasses a verification device that is or can be connected to a telecommunication network, and has a unit for acquiring biometric samples of subscribers who call or who are called and who are connected to the verification device via the telecommunication network using a communication terminal device that is appropriately configured for transmitting such a biometric sample. The device also includes a unit for detecting biometric characteristic structures from acquired biometric samples, and has a unit for computing a biometric on the basis of detected biometric characteristic structures. The device also includes a unit for storing biometrics for calling or called subscribers, and the verification device also encompasses a comparison unit for comparing a stored biometric having at least one characteristic of an acquired biometric characteristic structure as well as a connection unit for connecting a subscriber when the comparison result ascertained by the comparison unit reaches a first limit value. In addition, the device also includes an adaptation unit for computing and storing an adapted biometric using the detected biometric characteristic structure when the comparison result ascertained by the comparison unit reaches a second limit value.

Preferably, in order to compute the adapted biometric, the adaptation unit additionally accesses the biometric that has been taken as the reference biometric for the comparison and/or it accesses at least one biometric sample and/or biometric characteristic structure of the subscriber that has been stored in a memory on the basis of an earlier communication connection.

The present invention is also able to perform a controlled authentication on the basis of biometric characteristics for different subscribers of a shared communication terminal device and/or telecommunication connection. The present invention is also advantageously configured so as to generate another item of identification data and to expand the identifier by this additional item of identification data, at least if the comparison between the reference biometric and the detected biometric characteristic structure does not yield any similarity.

Moreover, it is preferably provided for the identifier of the calling subscriber to be made available to the communication system once the identity has been verified, so that optionally additional user profile data associated with the subscriber can be accessed on the basis of the identifier, essentially without any time delay.

Exemplary embodiments of the present invention provide for the first limit value specified for the verification to be specified in each case as a function of the appertaining security requirement of the requested communication service.

In these embodiments, a practical refinement provides for an adaptation limit value that is separate from the first limit value to be specified as the second limit value provided for the adaptation.

In addition or as an alternative, the present invention provides for the first limit value specified for a certain security requirement to be specified as the second limit value provided for the adaptation, whereby preferably the first limit value specified for the highest security requirement is specified.

Particularly for purposes of performing a check of an adaptation that has been carried out in order to ensure a consistently high quality of the biometric, in additional embodiment variants according to the present invention, once the identity of the subscriber has been successfully verified, it is provided for the obtained comparison result or the obtained comparison value to also be made available to the communication system which then compares the obtained comparison value to the second limit value, so that, in response to the comparison result, any adaptation that the verification device might already have made to the biometric used for the comparison is reversed again.

To this end, the biometric used as the reference biometric for the comparison is advantageously temporarily stored before being adapted, and the temporarily stored biometric is read out again in order to reverse the adaptation and the adapted biometric is overwritten by the read-out reference biometric.

Furthermore, preferred embodiments of the present invention also provide for an adapted biometric for the identifier to be associated and to be stored, each time for the subscriber authentication for the plurality of communication services that require authentication.

Alternative embodiments of the present invention also provide for an adapted biometric for the identifier to be associated and to be stored as a function of the security requirements of the requested communication service, each time for the subscriber authentication of communication services that require authentication and that have the same security requirements.

In the present invention, a biometric that is associated and stored for the identifier for the subscriber authentication of the plurality of communication services that require authentication for purposes of initialization may be computed as a function of criteria that are specified for the highest security requirements.

As an identifier that is associated with a calling subscriber for purposes of making an assumption about an identity, especially an item of identification data that identifies the communication terminal device and/or a telecommunication connection used to connect the communication terminal device to the telecommunication network is transmitted, whereby, for example, a CLI, ANI, HLR, IP address or ID number, is associated as the item of identification data with the communication terminal device and/or with the telecommunication connection for purposes of the identification.

As an alternative, an additional or expanded identifier which is assigned to a subscriber or to which a subscriber is assigned for purposes of making an assumption about the identity of the subscriber, and/or an identifier that directly identifies the subscriber who is connected to the telecommunication network via the communication terminal device, is transmitted to the verification device, whereby identification data such as, for instance, a PIN, is associated with the subscriber as such for identification purposes.

In a practical manner, in the method according to the present invention, depending on the application-specific configuration, a biometric sample that is based on acoustic data, optical data and/or behavioral data can be acquired as the biometric sample and further processed for an authentication procedure.

Thus, when the biometric sample is being acquired, it is especially provided that, depending on the configuration of the communication terminal device and on the configuration of the verification device, speech utterances, a hand, a finger, the face, the eye and/or the keyboard use profile of the calling subscriber are acquired by means of digitizing signals and evaluated.

A verification device employed within the scope of the invention in order to verify the identity of a calling or called subscriber is therefore preferably configured to evaluate speech utterances for purposes of identifying persons and/or configured to evaluate other biometric characteristics, particularly fingerprints, faces, eyes, handwriting, hand shapes, hand prints and/or keyboard use profiles, for purposes of identifying persons.

The present invention will be described in greater detail below with reference to examples of preferred embodiments which particularly evaluate speech utterances as biometric characteristics. However, explicit mention should be made of the fact that, depending on the communication terminal devices available to a user (8) or to a calling or called subscriber, it is within the scope of the invention to provide, aside from speaker verification, speaker identification or speaker classification by means of speech utterances by the speaker, other methods for identifying persons and verifying the identity of a subscriber, such as a verification by means of a fingerprint, face, eye, handwriting, hand shape and hand print or by means of a keyboard use profile, etc. However, the calling or called subscriber should have appropriately configured communication terminal devices and the verification devices should have appropriate recognition systems.

Figure 1:
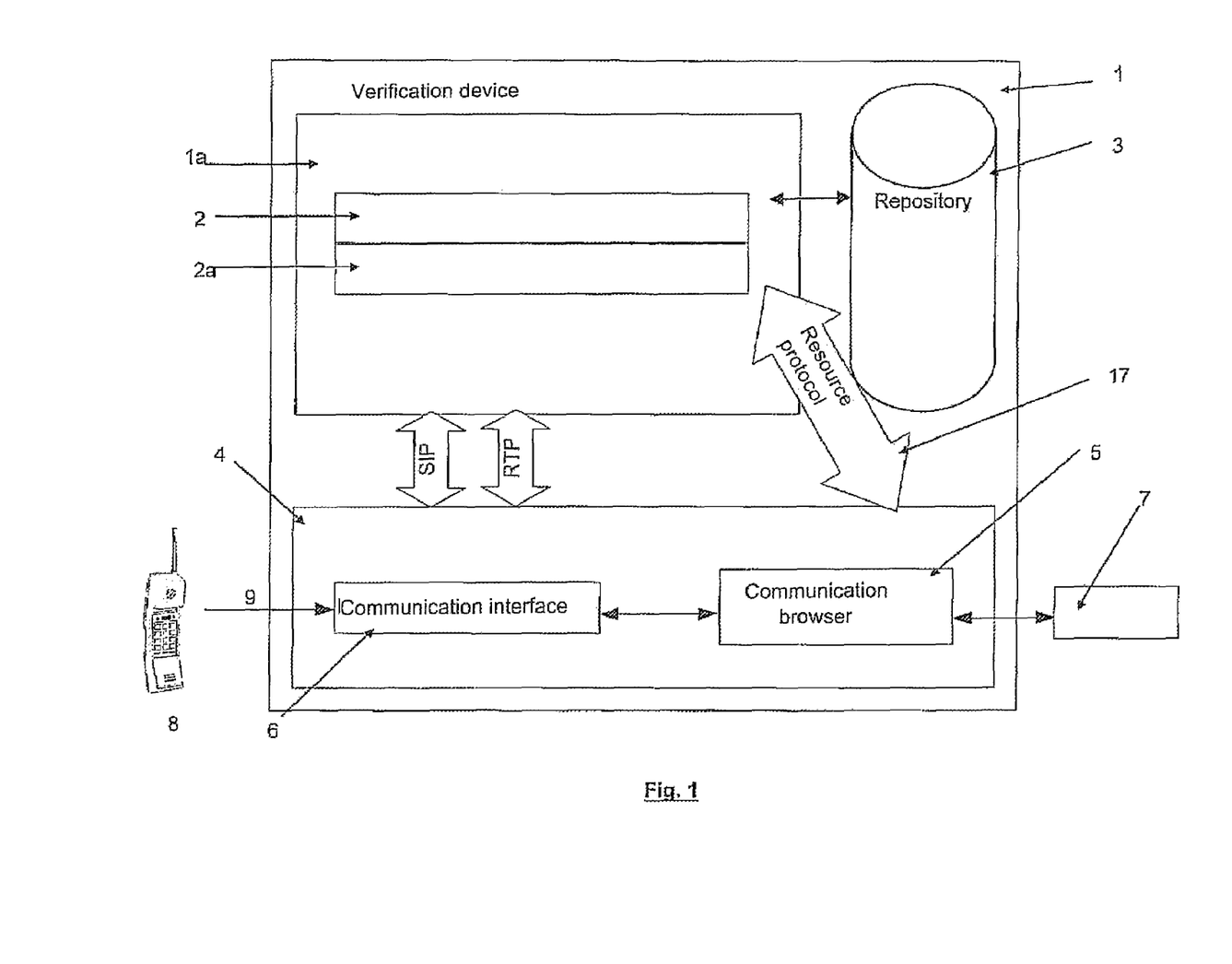
FIG. 1 illustrates a system for subscriber authentication according to a first embodiment of the present invention.

FIG. 1 shows a general overall system for verifying the identity of a calling or called subscriber 8 with a communication terminal device such as a telephone, camera, computer, fax machine, etc. by evaluating acquired biometric characteristics. Specifically, reference numeral 1 designates a verification device that provides the verification platform or level according to the invention and that is configured, for example, to identify persons by evaluating speech utterances. The verification device according to the invention can be part of a telecommunication network or can be connected to such a telecommunication network.

For purposes of carrying out the verification method described below, the verification device depicted in FIG. 1 comprises a speech server 1*a*, a module 2 that employs the principle of speaker verification by means of biometric characteristics for purposes of the authentication, as well as other recognition modules 2*a*, e.g., for speech recognition, for DTMF recognition and/or for text-to-speech conversion. The verification device also comprises at least one memory or repository 3 for storing biometrics and other data such as, for example, CLI, user ID, HLR, or IP addresses of different users and calling or called subscribers 8. Furthermore, the reference numeral 4 designates a communication server equipped with other communication auxiliaries such as, for instance, a communication browser 5 encompassing, for instance, a so-called VoiceXML interpreter module, and having a communication interface 6, e.g., a telephone interface, via which the verification device 1 is connected to a telecommunication network, and speech as well as user identifiers, terminal-device identifiers and/or connection identifiers 9 of the subscriber 8 are transmitted. The data exchange between the communication server 4 and the speech server 1*a* takes place, for example, via an SIP (session initiation protocol) for signaling purposes, via an RTP (real-time transport protocol) for speech transmission, and via a suitable resource protocol 17 for controlling the resources.

The reference numeral 7 designates a communication system which provides an application level for supporting communication services that require authentication and that entail different security requirements and which encompasses, for example, a web/application server. Once the subscriber 8 has been successfully authenticated by the verification device 1 employing the authentication procedure described below with reference to FIGS. 2 through 5, he is connected or linked to the communication system 7.

FIGS. 2 through 5 show simplified structures of several preferred variants—although they are only provided by way of example—of the inventive controlled verification of the identity of a subscriber 8 who is connected to the verification device 1 (FIG. 1) using a communication terminal device via at least one telecommunication network, on the basis of at least one biometric characteristic in order to connect the subscriber to such a communication system that supports at least one communication service that requires authentication from among a plurality of communication services that require authentication and that entail different security requirements.

After a communication connection has been established between the subscriber 8 and the verification device 1 that is connected to a telecommunication network, the subscriber is associated with an ascertained identifier 9 for purposes of making an assumption about the identity of the subscriber. In the case of a calling subscriber, for example, an identifier 9 is transmitted which is then associated with the subscriber. Therefore, through the transmission of the identifier, an assumption is made about the identity of the calling subscriber. In the case of a called subscriber, the latter can also be associated with an identifier ascertained in advance in order to activate the call.

As the identifier 9 that identifies the communication terminal device and/or the telecommunication connection used to connect the communication terminal device to the telecommunication network, e.g., a CLI, ANI, HLR, IP address or ID number can be transmitted as an item of identification data. As an identifier 9 that directly identifies the subscriber, for instance, a PIN can be transmitted as the item of identification data.

Moreover, a request to use at least one communication service that requires authentication is transmitted to the verification device 1 by the subscriber 8, and the verification device 1 acquires at least one biometric sample 12 of the calling subscriber 8 and detects 13 a biometric characteristic structure from the biometric sample 12. If the request is, for example, in the form of speech utterances, these can be simultaneously acquired as the biometric sample 12. If the request is made, for instance, by entering data using a keyboard, the technique of keyboard utilization, for example, can be acquired as the biometric sample 12.

On the basis of the ascertained identifier 9, it is then first checked whether a biometric has already once been computed, associated and stored for said identifier from at least one biometric characteristic structure for purposes of initialization. If this check reveals that such a biometric has not yet been computed, assigned and stored for the identifier for initialization purposes, then the verification device activates a teaching process T during which at least one biometric sample 12 is acquired on the basis of which characteristic structures are detected 13 and a biometric is computed 14a for the identifier 9 for purposes of initialization. Examples of biometric samples that can be acquired for the teaching process T are speech utterances during the transmission of the request are described above. The biometric computed from the at least one detected biometric characteristic structure for purposes of initialization is indexed by the identifier 9 and stored in a data area of the memory 3.

Such a teaching process T can optionally also be activated application-specifically when the subscriber or the verification device requests a resetting procedure or new teaching procedure, which is then indicated by suitable signaling.

At the time of a later contact "K" of the subscriber 8 or when the procedure for such a contact K is activated immediately after completion of the teaching process T, the identity about which an assumption has been made on the basis of the ascertained identifier 9 can be verified in an authentication procedure. For the procedure of such a contact K, during which biometric samples 12 are acquired and, in turn, characteristic structures are detected 13, speech utterances, for instance, can also be acquired as the biometric sample during the above-mentioned transmission of the request.

The initializing biometric is only computed once and the identifier 9 is indexed and stored for purposes of subscriber authentication for all existing and future services entailing different security requirements, thus forming the basis for all other biometrics that are subsequently adapted for the same identifier 9.

All of the structures depicted in FIGS. 2 through 5 have in common the fact that, when the authentication process is carried out for the requested communication service, the biometric 20a, 20b or 20c that is associated and stored for the identifier 9 for purposes of initialization, or else an adapted biometric 20a, 20b, 21c, 22c that is subsequently associated and stored for the identifier 9, is compared—for purposes of subscriber authentication, at least for the requested communication service, as the reference biometric—to at least one characteristic of the biometric characteristic structure 13 detected during the contact phase K by means of a comparison unit 10 encompassed by the verification device.

A measure of similarity, a characteristic number, a score or a comparative value computed in some other way is outputted as the comparison result 25. This comparison result 25 is then checked against a limit value 11, whereby a certain limit value 11 is specified for each different security level of a requested communication service that requires authentication, and the comparison result 25 has to comply with or reach said limit value 11 so that the identity of the subscriber 8 can then be successfully verified for the requested communication service and the calling subscriber can be connected to the communication system that supports this requested communication service. In FIGS. 2 to 5, the limit value 11a is specified, for example, for services having the highest security level, while the limit value 11b is specified for services having a medium security level and limit value 11e is specified for services having the lowest security level. When the limit value in question is observed or reached, then the request for a service having the corresponding security requirement is accepted and the subscriber is further connected accordingly.

As an example, assume that the maximum value or best value of the comparison result is 1.0, the limit value 11a is specified as 0.99, the limit value 11b as 0.98 and the limit value 11e as 0.93. If, for instance, the security level for a requested service, which can be, for example, an application or a sub-application, has been specified as a medium security level, then a user identifying himself for this application will only be accepted if the comparison result reaches at least the value 0.98.

Advantageously, the identifier is expanded by another item of identification data and appropriately stored as well as transmitted to the subscriber, at least if the comparison between the reference biometric and the acquired biometric characteristic structure does not yield any similarity, so that if applicable, even multiple subscribers with the same communication device and/or telecommunication connection can be identified individually.

Figure 2:
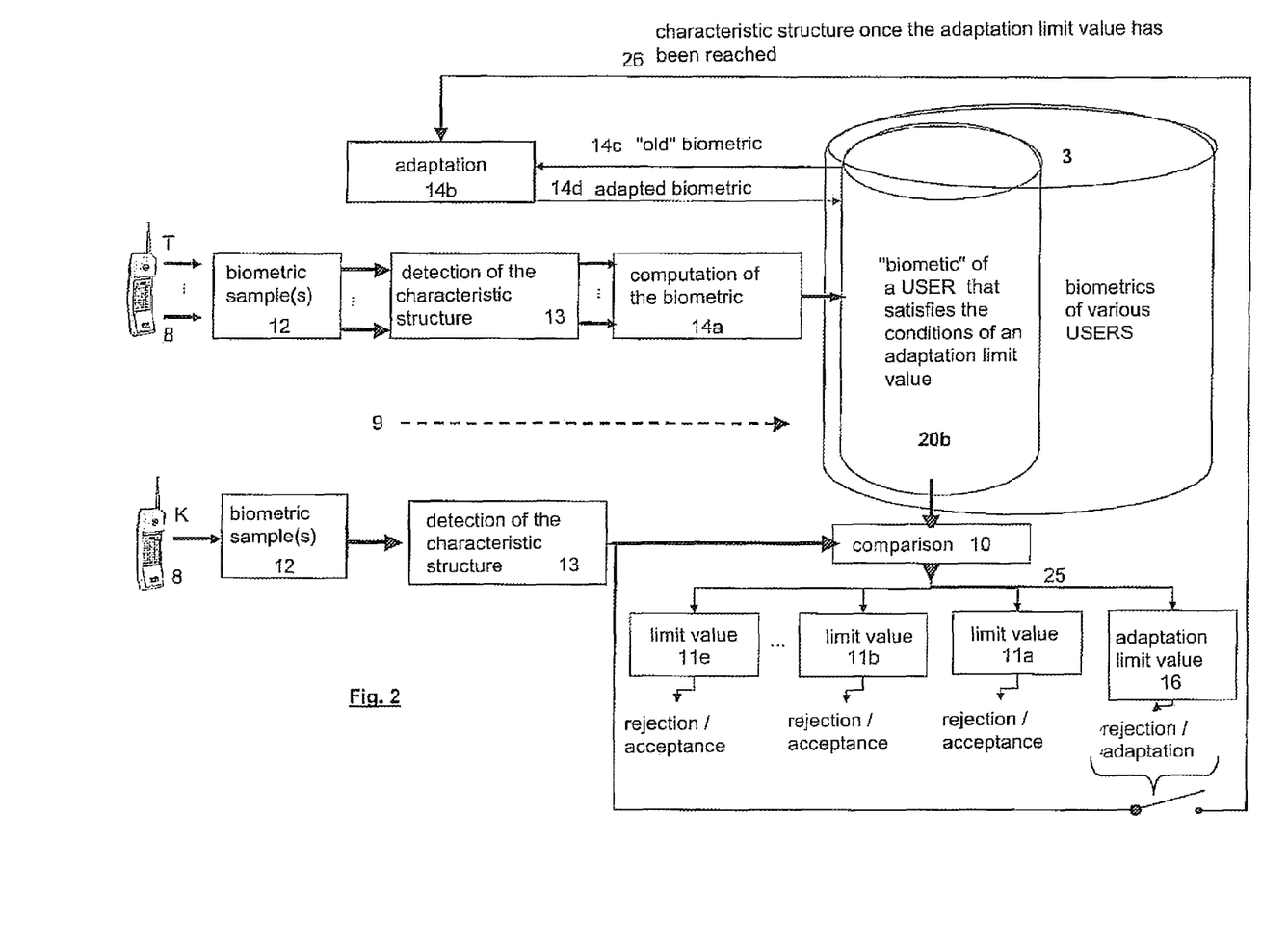
FIG. 2 illustrates a system for subscriber authentication according to a second embodiment of the present invention.

According to the embodiment variant shown in FIG. 2, a uniform, separate adaptation limit value 16 for the comparison result 25 is specified for all services in order to adapt the one stored biometric 20b during and/or after the verification. This adaptation limit value 16 can correspond, for instance, to the first limit value 11a for the highest security level of all of the services that can be used.

Thus, if a subscriber 8 has been successfully authenticated for a service with a lower security level, in other words, e.g. vis-à-vis the first limit value 11a, but the result of the authentication does not correspond to the requisite adaptation limit value 16, then the biometric sample acquired in this process is not used for the adaptation of the uniform biometric 20b for all of the services in the data area of the memory 3. An adaptation is only performed if the acquired biometric sample additionally satisfies the second limit value 11b specified for the adaptation. In this context, the decision about this is made within the authentication algorithm of the module 2 itself and the communication system 7 supplies the module 2 with a uniform adaptation limit value as the one-time initialization value. This means that, when a currently detected characteristic structure 13 is compared to the computed biometric that has been taught one time, the comparison result 25 is compared to the first limit value that is valid for the requested service as well as to the adaptation limit value 16.

Here, the separately handled adaptation limit value 16 can advantageously correspond to the limit value 11a having the highest security level.

If the comparison result 25 reaches the adaptation limit value 16, the currently detected characteristic structure is used for the adaptation 14b of a new biometric, as indicated by the reference numeral 26. Moreover, according to the present embodiment, the stored biometric 20b is read out of the data area as the "old" biometric 14c or as the biometric 14c to be adapted and then used for the adaptation 14b of the new biometric. The new adapted biometric 14d is subsequently stored in the data area of the memory 3 as the uniform biometric 20b for all of the services.

Figure 3:
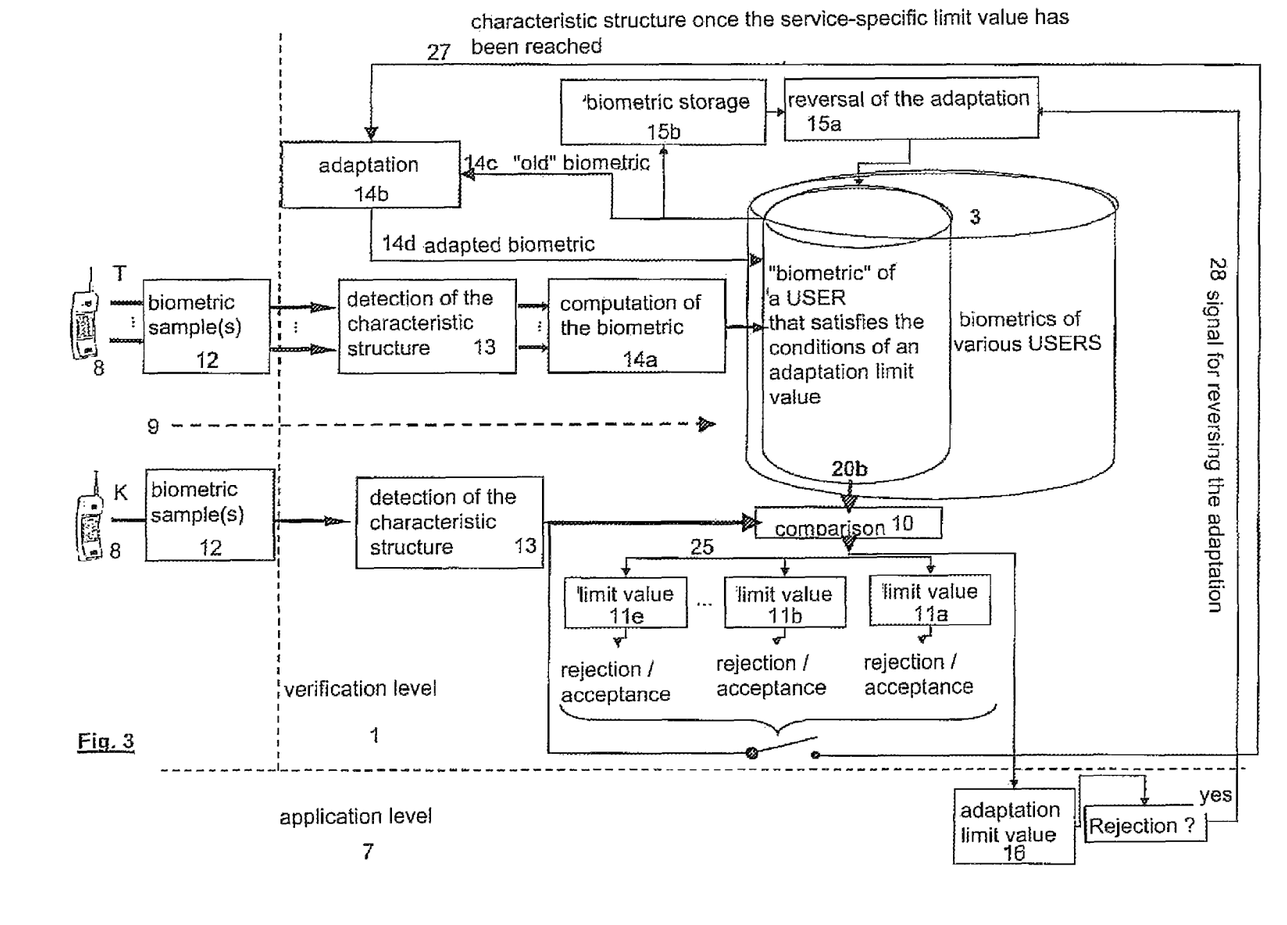
FIG. 3 illustrates a system for subscriber authentication according to a third embodiment of the present invention.

According to the embodiment shown in FIG. 3, a verification procedure is carried out as to when the comparison result 25 reaches the applicable, service-specific limit value 16. Optionally in this case, the uniform biometric 20b for all of the services is adapted, whereby the currently detected characteristic structure—indicated by the reference numeral 27—and the stored biometric 20b is used as the "old" biometric 14c or as the biometric 14c to be adapted in order to perform the adaptation 14b of the new biometric, and the new adapted biometric 14d is subsequently stored again in the data area of the memory 3 as the uniform biometric 20b for all of the services.

In this process, the communication system 7 of the correspondingly requested service receives the obtained comparison result 25 from the verification device 1 and, for the adaptation, the communication system 7 itself performs the comparison of the comparison result 25 to a specified adaptation limit value 16 that is advantageously the same for all of the services and/or that corresponds to the first limit value 11a of the highest security level.

If the authentication for a service having a lower security level has been successfully completed but if the comparison result does not satisfy the specified adaptation limit value 16, then any adaptation of the biometric 20b that might already have been performed is discarded or disallowed. For this purpose, in order to reverse the adaptation, the "old" biometric or the biometric that is to be adapted can be temporarily stored in a memory 15b and can be read out again in response to a signal 28 transmitted by the communication system and the adapted biometric 20b that has just been stored is once again overwritten by the "old" biometric that was stored in the biometric memory 15b before the adaptation in order to reverse the adaptation 15a. As shown in the embodiment according to FIG. 3, the biometric 20b to be employed for the comparison for a subscriber authentication always complies with the stipulations of the separate adaptation value.

Figure 4:
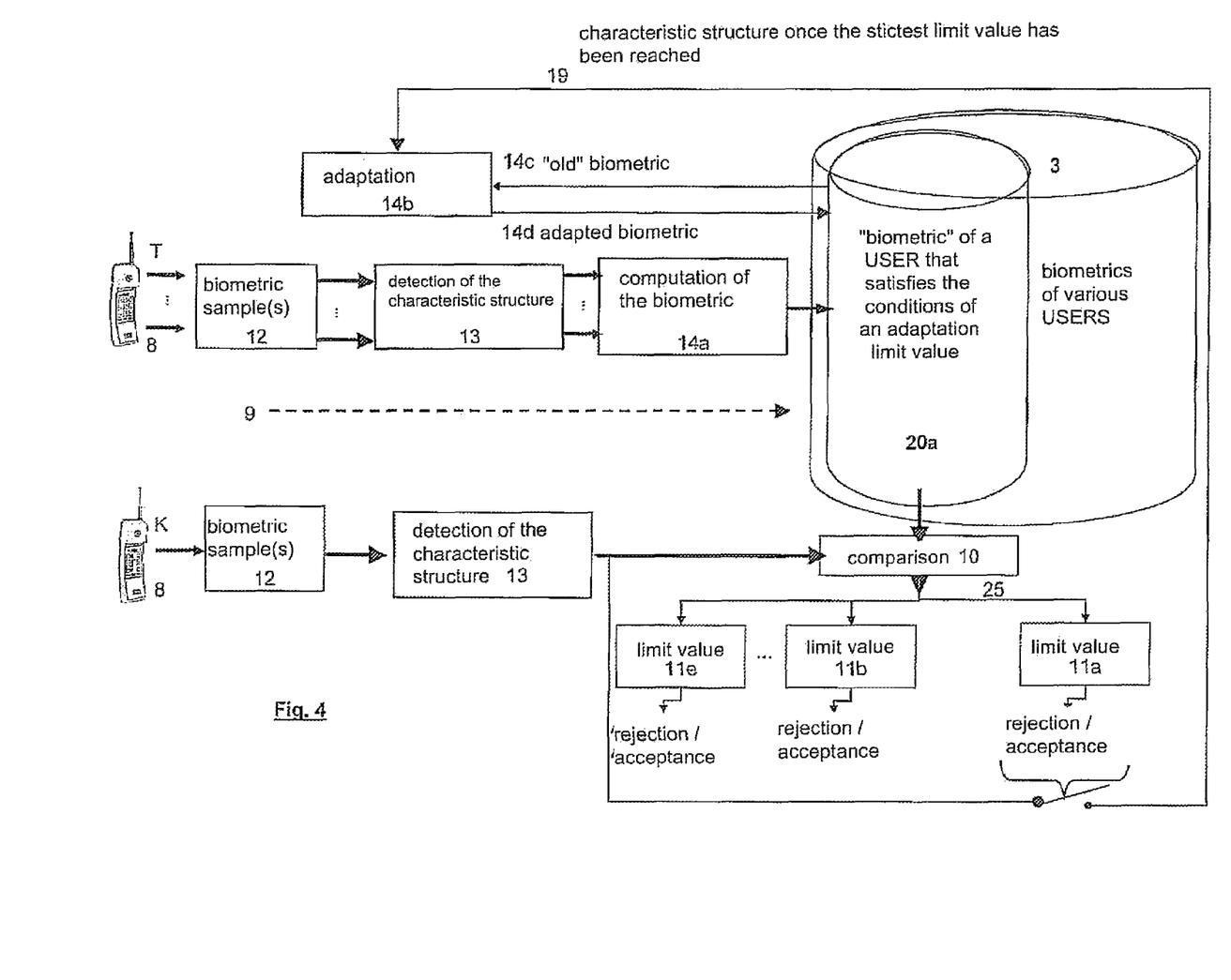
FIG. 4 illustrates a system for subscriber authentication according to a fourth embodiment of the present invention.

According to the embodiment shown in FIG. 4, the initial teaching process that serves to generate the biometric 20a is only carried out, for instance, according to the criteria of the highest security level. In any case, an adaptation of the biometric 20a is only permissible if the subscriber 8 has successfully authenticated himself for a service having the highest security level, that is to say, vis-à-vis the first limit value 11a.

If the comparison result 25 reaches the highest limit value 11a, the currently detected characteristic structure—as indicated by the reference numeral 19—is used for the adaptation 14b of a new biometric. Moreover, the stored biometric 20a, as the "old" biometric 14c or as the biometric 14c to be adapted, is used for the adaptation 14b of the new biometric. The new adapted biometric 14d is subsequently stored in the data area of the memory 3 as the uniform biometric 20a for all of the services. The embodiment according to FIG. 4 provides that the biometric 20a used for the comparison for a subscriber authentication always complies with the stipulations of the limit value 11a of the highest security level.

Figure 5:
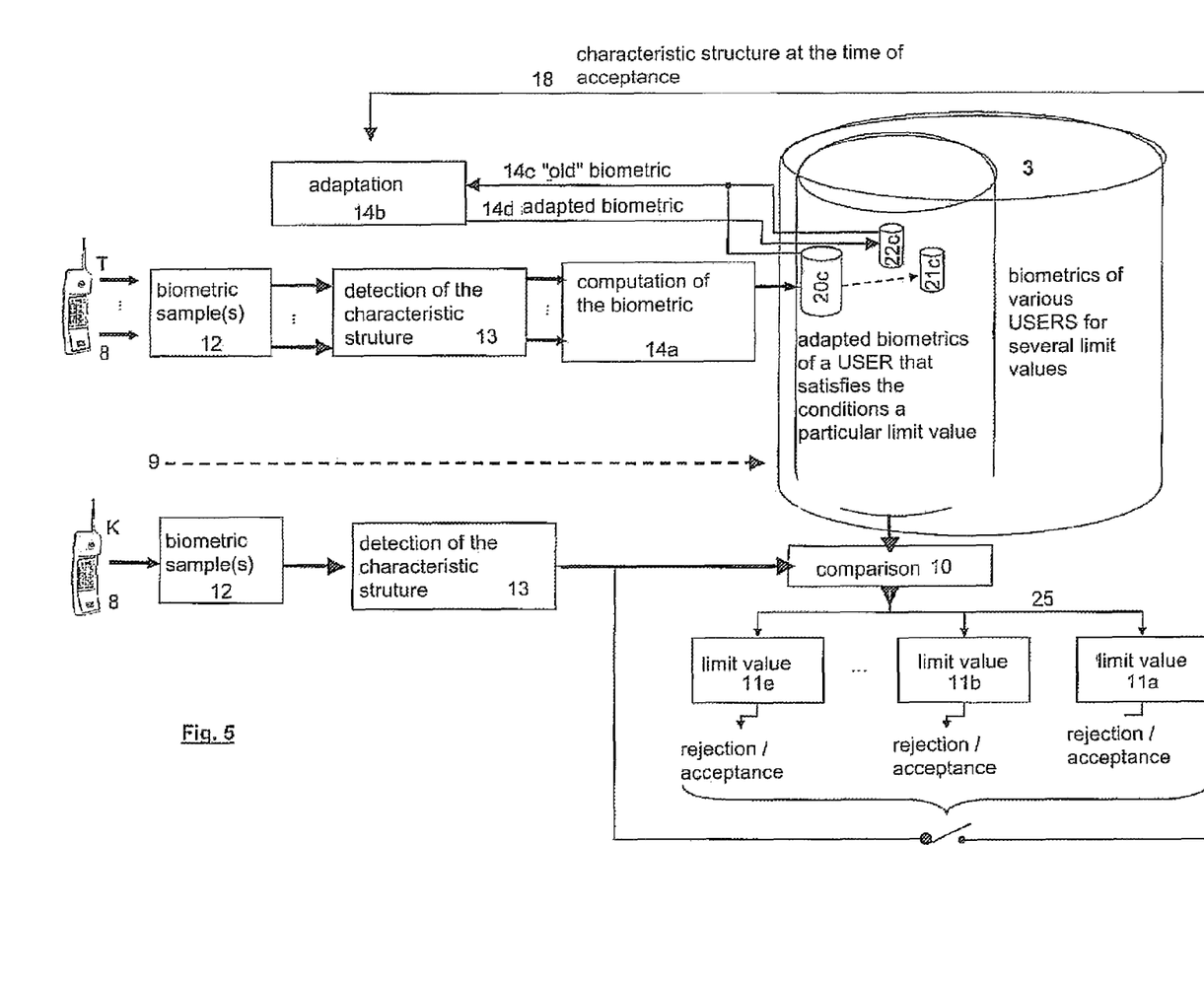
FIG. 5 illustrates a system for subscriber authentication according to a fifth embodiment of the present invention.

According to the embodiment shown in FIG. 5, a single biometric of a subscriber 8 is computed 14 during a one-time teaching process T and stored in a data area of the memory 3 as the biometric 20c in such a manner as to be indexed by the identifier 9, for purposes of authenticating the correspondingly identified subscriber 9 for all of the specified or for an expandable number of communication services that require authentication.

In contrast to the embodiment variants according to FIGS. 2 through 4, however, the biometric 20c as such is no longer changed or adapted. The biometric 20c is employed by the verification device as a master biometric in the subsequent adaptation procedures and thus serves as the basis for various adapted biometrics 21c, 22c of the subscriber 8 which are used in the comparison 10 for different security levels.

In a first contact phase K for authenticating the subscriber 8 for a service with a given security level, for instance, with a medium security level, the biometric 20c is used for the comparison to the currently detected characteristic structure 13 and the comparison result 25 is checked against the limit value correspondingly associated with the security level, for example, the limit value 11b. Moreover, in this case, the first limit value 11b specified for this certain security level is also specified as the adaptation limit value. If the comparison result 25 satisfies the limit value 11b, the subscriber 8 is authorized to make use of the service and is connected to the communication system that supports this service. In addition, since the comparison result 25 consequently also reaches the same adaptation limit value, the currently detected characteristic structure—as indicated by the reference numeral 18—is used for the adaptation 14b of a new biometric.

Moreover, the stored biometric 20c, as the "old" biometric 14c or as the biometric 14c to be adapted, is used for the adaptation 14b of a new biometric. The new adapted biometric 14d is subsequently stored in the data area of the memory 3 as the uniform biometric 22c for all of the services having this specific security level, that is to say, in the present case, all of the services for which the limit value 11b has been specified for the authentication.

During the subsequent contact phase K for authenticating the subscriber 8 for a service having this security level, the biometric 22c is then used for the comparison to the currently detected characteristic structure 13 and the comparison result 25 is checked against the limit value 11b. If the subscriber 8 is accepted during such an authentication procedure at this security level, the changeable biometric 22c of this security level can be correspondingly adapted once again in any case. In other words, the stored biometric 22c, as the "old" biometric 14c or as the biometric 14c to be adapted, is read out of the data area and used for the adaptation 14b of a new biometric. The new adapted biometric 14d is subsequently stored again in the data area of the memory 3 as the uniform biometric 22c for all of the services for which the limit value 11b was specified for the authentication. If it should happen here that the quality of the biometric 22c were to deteriorate over the course of time, the verification device is advantageously adjusted so as to perform a renewed adaptation according to the first contact phase K as described above.

In a modification of the embodiment presented in FIG. 5, the biometric 20c used by the verification device as the master biometric is initially copied as biometrics 21c, 22c of the subscriber 8 and stored. Then, only those copies are used for the comparison and adapted for purposes of authenticating the subscriber 8 during a first contact phase K as well as during subsequent contact phases K.

Therefore, all of the embodiments according to the present invention have in common that, for different security levels, only one single biometric needs to be generated for each user for purposes of initialization, said biometric being adapted during and/or after at least one verification phase under compliance with at least one specified limit value and making use of the biometric samples obtained during the verification. The embodiments illustrated in FIGS. 2 through 4 have in common that only one single adaptation limit value has to be complied with for the adaptation of the biometric, even for different security levels with different verification limit values, said adaptation limit value preferably corresponding to at least the verification limit value of the highest security level.

Even though the present invention has been described on the basis of embodiments in which a stored biometric that is used as an "old" biometric 14c or as a biometric 14c to be adapted is also employed as a reference biometric for the adaptation of a new biometric, this is neither absolutely necessary nor to be construed as a limitation of the invention. An adaptation can also be carried out without the need for a biometric used as reference biometric during the authentication procedure to be incorporated into the computation of a new adapted biometric. Moreover, if at least one biometric sample and/or biometric characteristic structure of the subscriber has been stored in an application-specific manner on the basis of an earlier communication connection with the subscriber, then such a sample and/or biometric characteristic structure can also be incorporated, for example, into the computation of a new adapted biometric.

The process of adaptation according to the invention can be employed, for example, to adapt a biometric to the gradual change that occurs in the biometric characteristic of the same user/subscriber. This can be, for instance, the voiceprint of a voice as it changes. Since the verification device consequently has to carry out complex processing steps for the subscriber authentication, it is practical to undertake a software-supported implementation of the verification device for carrying out the processing sequences, for example, by means of a storage medium where signals are stored which, for this purpose, are read out in a computer-supported device connected to a telecommunication network.

While the present invention has been particularly shown and described with reference to preferred embodiments thereof, it will be understood by those skilled in the art that various changes in form and details may be made therein without departing from the spirit and scope of the invention.

What is claimed is:

1. A method for verifying an identity of a subscriber who has called, or who has been called, via a telecommunications network, the method comprising the steps of:
   providing a communication system that supports at least a first communication service requiring authentication from a plurality of communication services, each of the plurality of communication services requiring authentication and having different security requirements;
   providing a verification device connected to the telecommunications network, the subscriber connecting to the telecommunications network via a communication terminal device in order to connect to the first communication service;
   establishing a communication connection between the subscriber and the verification device;
   associating an identifier and the subscriber in order to identify the subscriber;
   associating and storing a first biometric for the identifier for initialization purposes as a reference biometric;
   transmitting, to the verification device, a request to use the first communication service;
   carrying out a subscriber authentication procedure for the requested first communication service by:
      acquiring a biometric sample of the subscriber;
      storing the acquired biometric sample of the subscriber;
      detecting a biometric characteristic structure from the biometric sample;
      comparing the reference biometric to at least one characteristic of the detected biometric characteristic structure to generate a comparison result;
      if the comparison result reaches a first limit value:
         verifying the identification of the calling subscriber for the requested first communication service; and
         connecting the subscriber to the communication system that supports the requested communication service;
      if the comparison result reaches a second limit value:
         computing, using the detected biometric characteristic structure and at least one of the reference biometric and a stored biometric sample from an earlier communication connection with the subscriber, an adapted biometric;
         associating and storing the adapted biometric for the identifier as an updated reference biometric; and
         using the updated reference biometric for authenticating the subscriber for the requested first communication service.

2. The method recited in claim 1, further comprising the steps of:
   prior to the execution of the subscriber authenticating step, checking whether the identified subscriber should be treated as a first-time user or whether a resetting procedure, which has been indicated by the subscriber or by the verification device by means of a signal, should be performed for the identified subscriber;
   if it is determined that the subscriber is a first-time user, or if the resetting procedure should be performed:

computing a second biometric on the basis of at least one biometric characteristic structure; and associating and storing the second biometric for the identifier for initialization purposes in order to authenticate the subscriber for the plurality of communication services that require authentication.

3. The method recited in claim 1, further comprising the steps of:

if the comparison between the reference biometric and the detected biometric characteristic structure does not yield any similarity, generating a second item of identification data; and expanding the identifier with the second item of identification data.

4. The method recited in claim 1, further comprising the step of:

making available, to the communication system, the identifier of the subscriber once the identity of the subscriber has been verified.

5. The method recited in claim 1, further comprising the step of:

specifying the first limit value as a function of the appertaining security requirement of the requested communication service.

6. The method recited in claim 1, further comprising the step of:

specifying, as the second limit value, an adaptation limit value that is separate from the first limit value.

7. The method recited in claim 1, further comprising the step of:

specifying, as the second limit value, the first limit value specified for a certain security requirement.

8. The method recited in claim 7, wherein the first limit value is a limit value specified for the highest security requirement of the plurality of connection services.

9. The method recited in claim 1, further comprising the steps of:

once the identity of the subscriber has been verified, making the comparison result available to the communication system;

comparing, by the communication system, the comparison result to the second limit value; and in response to the comparison by the communication system, reversing any adaptation that the verification device has made to the biometric used as the reference biometric.

10. The method recited in claim 1, further comprising the steps of:

before adapting the reference biometric, temporarily storing the reference biometric;

reading out the temporarily-stored reference biometric to reverse an adaptation; and overwriting the adapted reference biometric with the read-out reference biometric.

11. The method recited in claim 1, further comprising the step of:

each time one of the plurality of communication services requires authentication, associating and storing an adapted biometric for the identifier for the subscriber authentication.

12. The method recited in claim 1, further comprising the step of:

for the plurality of communication services that require authentication and have the same security requirements, associating and storing an adapted biometric for the identifier as a function of a security requirement of the requested communication service.

13. The method recited in claim 1, further comprising the step of:

for the computation of a biometric that is associated and stored for the identifier for the subscriber authentication of the plurality of communication services that require authentication for purposes of initialization, specifying a function that depends on a criteria of the highest security requirement.

14. The method recited in claim 1, further comprising the step of:

determining, as the identifier, an item of identification data that identifies at least one of the communication terminal device and the telecommunication connection used to connect the communication terminal device to the telecommunication network.

15. The method recited in claim 14, wherein the item of identification comprises at least one of a CLI, ANI, HLR, IP address and ID number.

16. The method recited in claim 1, further comprising the step of:

determining, as the identifier, an item of identification data that identifies the calling subscriber who is connected via the communication terminal device to the telecommunication network.

17. The method recited in claim 16, wherein the item of identification data comprises a PIN.

18. The method recited in claim 1, wherein the biometric sample is based on at least one of acoustic data, optical data and behavioral data.

19. The method recited in claim 1, wherein the step of acquiring the biometric sample is performed, depending on the configuration of the communication terminal device and on the configuration of the verification device, using a digitizing signal to gather at least one of speech utterances, a hand, a finger, the face, the eye, and the keyboard use profile of the calling subscriber.

20. A device for verifying an identity of a subscriber who has called, or has been called, via a telecommunications network, the device connectable to the telecommunications network and comprising:

a communication terminal device configured for transmitting a biometric sample of the subscriber, the subscriber being connected to the verification device through the communication terminal device and the telecommunications network;

an acquisition unit operable to acquire the biometric sample of the subscriber;

a detection unit operable to detect at least one biometric characteristic structure from the acquired biometric sample;

a computation unit operable to compute a biometric on the basis of the at least one detected biometric characteristic structure;

a storage unit operable to store the biometric of the subscriber;

a comparison unit operable to compare the stored biometric having at least one characteristic of the at least one detected biometric characteristic structure with a reference biometric to generate a comparison result;

a connection unit operable to connect the subscriber when the comparison result ascertained by the comparison unit reaches a first limit value; and an adaption unit operable to compute and store an adapted biometric using the detected biometric characteristic structure and at least one of the reference biometric and a stored biometric sample from an earlier communication connection with the subscriber when the comparison result ascertained by the comparison unit reaches a second limit value.

21. The device recited in claim 20, further comprising:
a verification unit operable to evaluate at least one of a speech utterance, fingerprint, faces, eye, handwriting, hand shape, hand print, and keyboard use profile so as to verify the identity of the subscriber.

22. A non-transitory computer-readable medium encoded with a computer program for verifying an identity of a subscriber who has called, or has been called, via a telecommunications network having:
   a communication system that supports at least a first communication service requiring authentication from a plurality of communication services, each of the plurality of communication services requiring authentication and having different security requirements; and
   a verification device connected to the telecommunications network, wherein:
   the subscriber connects to the telecommunications network via a communication terminal device in order to connect to the first communication service;
   a communication connection is established between the subscriber and the verification device; and
   the program is configured to:
      associate an identifier and the subscriber in order to identify the subscriber;
      associate and store a first biometric for the identifier for initialization purposes as a reference biometric;
      transmit, to the verification device, a request to use the first communication service;
      carry out a subscriber authentication procedure for the requested first communication service by:
         acquiring a biometric sample of the subscriber;
         storing the acquired biometric sample of the subscriber;
         detecting a biometric characteristic structure from the biometric sample;
         comparing, the reference biometric to at least one characteristic of the detected biometric characteristic structure to generate a comparison result;
      if the comparison result reaches a first limit value:
         verifying the identification of the calling subscriber for the requested first communication service; and
         connecting the subscriber to the communication system that supports the requested communication service;
      if the comparison result reaches a second limit value:
         computing, using the detected biometric characteristic structure and at least one of the reference biometric and a stored biometric sample from an earlier communication connection with the subscriber, an adapted biometric;
         associating and storing the adapted biometric for the identifier as an updated reference biometric; and
         using the updated reference biometric for authenticating the subscriber for the requested first communication service.

* * * * *